United States Patent

Barron

[15] 3,696,395
[45] Oct. 3, 1972

[54] MANUALLY CONTROLLED AUTOMATIC INFORMATION DISPLAY DEVICE

[72] Inventor: Norman Barron, La Puente, Calif.

[73] Assignees: Wm. Douglas Sellers; George A. Brace, ; part interest to each

[22] Filed: Aug. 5, 1970

[21] Appl. No.: 61,290

[52] U.S. Cl. .................................. 340/325, 340/309.1
[51] Int. Cl. ............................................... G09f 11/16
[58] Field of Search ....340/325, 324 R, 309.4, 309.1, 340/334, 339, 316, 324

[56] References Cited

UNITED STATES PATENTS

| | | | |
|---|---|---|---|
| 3,582,937 | 6/1971 | Dozer | 340/325 |
| 3,256,512 | 6/1966 | Pickett et al. | 340/154 X |
| 3,594,926 | 7/1971 | Reed | 340/309.1 |
| 3,171,114 | 2/1965 | Butler et al. | 340/379 X |
| 3,305,836 | 2/1967 | Buckle et al. | 340/147 |
| 3,307,170 | 2/1967 | Aoyama et al. | 340/324 |
| 3,199,098 | 8/1965 | Schartz | 340/324 |
| 3,491,354 | 1/1970 | Tschumi | 340/325 X |

Primary Examiner—Donald J. Yusko
Attorney—Sellers and Brace

[57] ABSTRACT

An information display device having a wide variety of uses in recording and displaying graphically separate multiple channels of related types of information for visual analysis and comparison by one or more persons. One of the many typical uses is to record and keep abreast of the progress of assignments to each of a group of technicians charged with making emergency repair runs to various parts of a complex system, such as a utility system. The control operator is advised of the essential information required to monitor each job assignment and receives periodic progress reports. The apparatus control console is then operated to update a particular display board indicator for that workman to show the status of his particular assignments as well as to update totalizer mechanism. More than one control console can be connected in tandem to operate the same display board from different parts of a large room.

40 Claims, 4 Drawing Figures

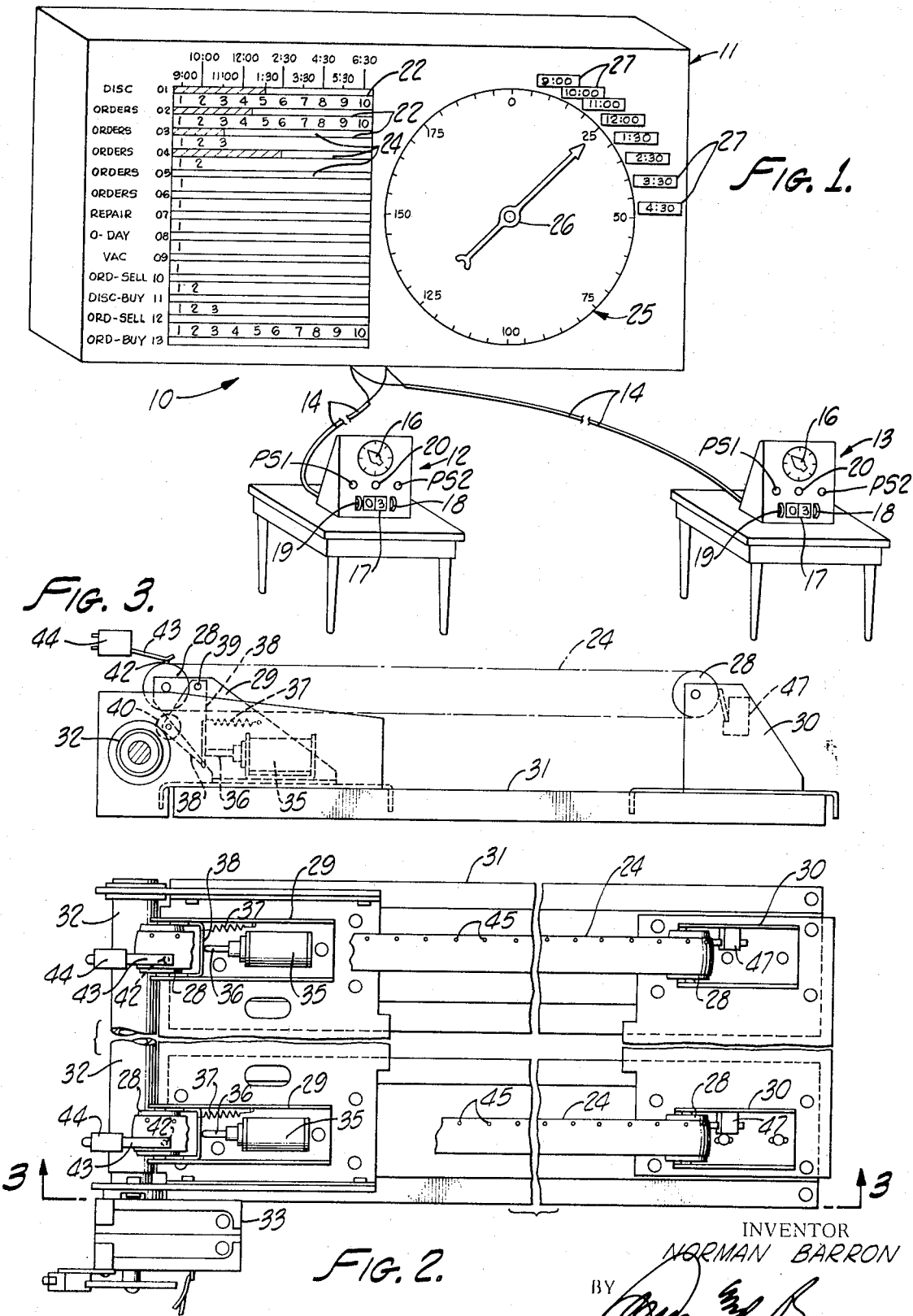
FIG. 1.
FIG. 3.
FIG. 2.
INVENTOR
NORMAN BARRON
ATTORNEYS

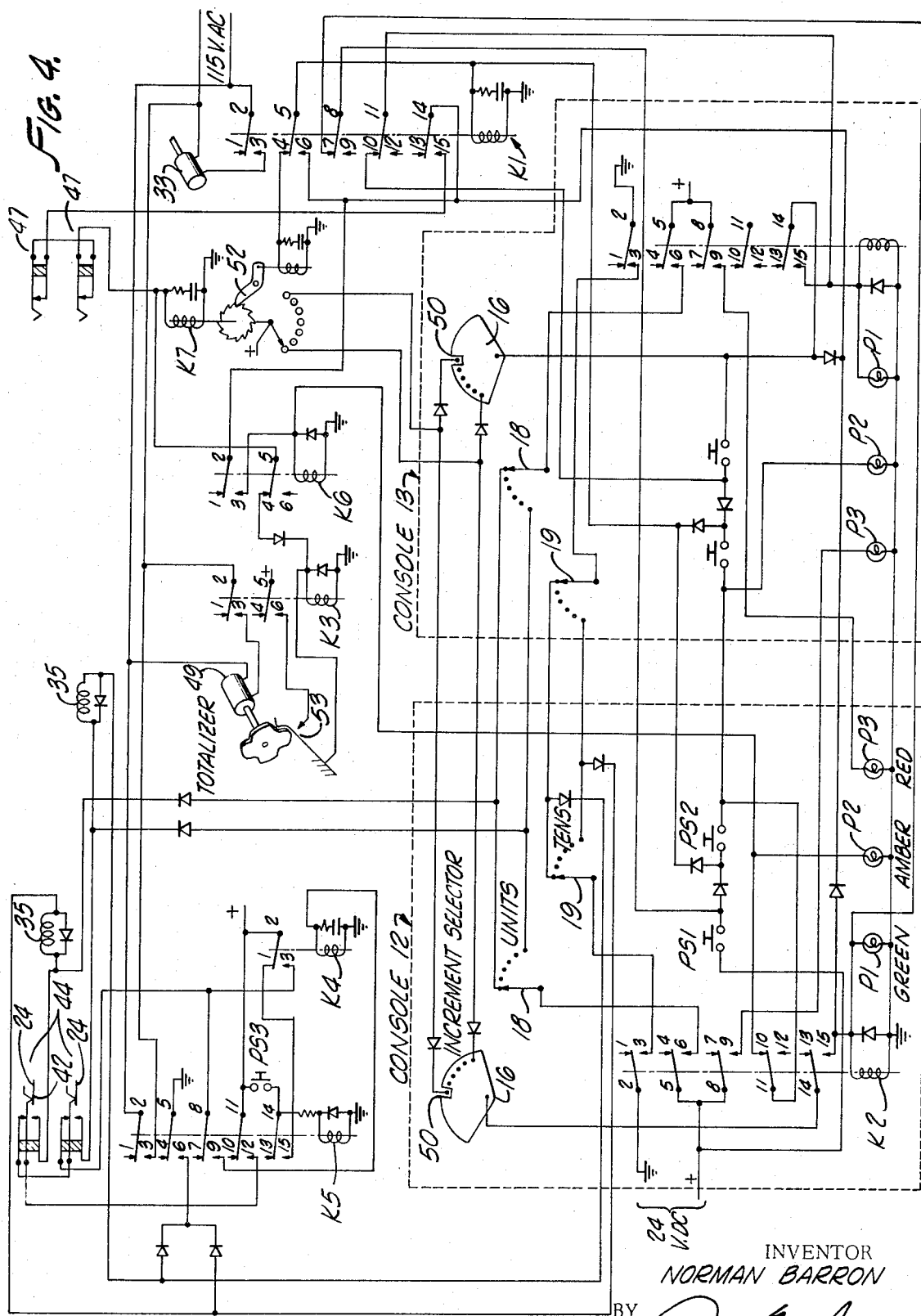

MANUALLY CONTROLLED AUTOMATIC INFORMATION DISPLAY DEVICE

This invention relates to display equipment and more particularly to unique automated mechanism for displaying multiple channels of information each separately controllable from one or more remote control stations and having a wide variety of applications in displaying quickly changed and updated information in readily interpreted form.

There are today a wide variety of operations characterized by a multiplicity of data and information requiring analysis, interpretation and decisions by supervisors and management personnel. Typical applications of the invention apparatus involve both personnel processing operations, material, inventory control, and many, many others. By way of illustration, utility companies maintain a pool of trained service personnel including those having assorted skills and specialities assignable to investigate and service trouble reported to exist at any point in the system. The efficient and effective utilization of this personnel and of the equipment required for their use present vexing questions for staff personnel in charge of these operations. Repeated attempts have been made to provide forms, tables, charts and other aids for the control of such servicing operations, but, in general, these do little to assist the overall operation, burden the entire staff with complex and irksome paperwork and lack the requisite flexibility to accommodate the endlessly varying situations encountered in actual practice.

Proposals have been made to utilize computer equipment but with minimal success. Not only does this make inadequate use of complex and costly equipment and the services of highly skilled operator personnel, but presents ever-changing problems for the programmers charged with the task of programming the computer. This leaves unmentioned the problem of obtaining liasion personnel having knowledge of computer programming capabilities along with a practical knowledge of utility repair and servicing operations.

The present invention avoids the foregoing and many other short-comings of prior proposals for programming, analyzing and updating multiplex operations of the general type just referred to. In an exemplary embodiment, the invention utilizes a main display board presenting in greatly enlarged form multiple channels of readily read and compared information. The board includes a large totalizer device operable automatically to sum the information supplied to each information channel. Associated with the totalizer are magnetic plaques adapted to be repositioned as desired opposite selected areas of the main scale and enabling the observer to compare scheduled achievement with actual achievement. The board is operable under remote control from one or more independent control consoles connected in tandem. Normally these are located in the same room containing the display board but one or more consoles may be located elsewhere and operated by a clerk or other person to feed updating information to the display board. The apparatus includes numerous interlocks and safeguards against introducing erroneous and unintended information into the system, including those preventing operation of one console while another is in use to update the display board. Also included are pilot lights and other indicators advising the operator of various system conditions such as when a particular console is available for updating as well as when this operation has been completed.

It is therefore a primary object of the present invention to provide a highly versatile display device readily controlled to record and display for convenient analysis and interpretation multiple channels of information.

Another object of the invention is the provision of equipment for displaying periodically changing information of assorted types in convenient array for interpreation and analysis and adapted to be changed from either a single or any number of duplicate control stations located in widely separated areas.

Another object of the invention is the provision of apparatus for displaying changeable information on a large display panel readily read at a distance and equipped with multiple independently operable indicators readily shifted to a new position to update incoming information.

Another object of the invention is the provision of recording and display apparatus quickly and readily operated by the manipulation of simple controls to register changing incoming information as it is received by wire or otherwise without need for making written entries.

These and other more specific objects will appear upon reading the following specification and claims and upon considering in connection therewith the attached drawing to which they relate.

Referring now to the drawing in which a preferred embodiment of the invention is illustrated:

FIG. 1 is a perspective view of an illustrative embodiment of the invention including a pair of control consoles;

FIG. 2 is a fragmentary front plan view showing the operating mechanism associated with a pair of information channels;

FIG. 3 is a sectional elevational view taken along line 3—3 on FIG. 2; and

FIG. 4 is a schematic of the electrical control of the display apparatus.

IN GENERAL

Referring initially more particularly to FIGS. 1-3, there is shown an illustrative embodiment of the display apparatus, designated generally 10, comprising as its principal components a large upright display board or panel 11, and one or more independent control consoles 12,13 connected to board 11 by cabling 14. Each console is equipped with controls and indicators including a channel increment control 16, a data input control PS1, a totalizer disconnect control PS2, a channel selector 17 having a "tens" control knob 18 and a "units" control knob 19, and an "in use" indicator 20. The purposes and mode of operation of these various controls will be described more fully presently.

Referring to the display panel 11, it will be understood that the illustrated board is provided with any desired number of long, narrow, horizontally arranged window slots 22 overlying an associated movable indicator, such as the flexible stripping or endless belting 24 (FIGS. 2, 3), having its opposite end portions distinctively marked in contrasting colors, as black and white. Thus one half of the belt is colored white and the other half black in order that a particular window may be filled from end to end either with one color or the other, or partially by both. Although the movable indicators 24 are herein illustrated by way of example as flexible strips or belts, it will be understood that other types of movable indicators may be employed, including pointers or elongated rollers contrastingly colored in stepped increments circumferentially thereof.

Each movable indicator, as herein shown, is supported directly behind the associated window which is preferably covered by transparent material to exclude dust and the like. Each display channel is distinctively identified opposite its left hand end by a suitable title as well as by a number. Although 13 display channels are herein illustrated, it will be understood that there may be any desired number. The individual channels are subdivided into appropriate increments such as the increments numbered 1 to 10, in the area between adjacent windows. By this means an observer can quickly determine the point of advance lengthwise of the window of the line demarking the merger of the distinctively colored ends of each tape.

Additionally, the display panel is preferably provided with information indicia across the top of the upper window. Thus the display device is there appropriately captioned to represent the actual status of the operations under surveillance at different times during a work day. It will be noted that the lunch period has been omitted since normally this is not a working period.

The right hand half of display board 11 includes a single large scale indicator comprising a totalizer 25 having graduated scale representing the sum of all hours of display channels representing time. For example, certain information channels represent data other than increments of time and obviously it is undesirable to enter information from these channels on the totalizer as the scale of the latter is being used to indicate time. It will of course be apparent that the totalizer scale may be used to sum information other than time in which event its scale is appropriately graduated and marked. A motor driven indicator 26 rotates clockwise past the hour scale from a selected starting point such as the 12-o'clock position. The front panel of the display board is preferably sheet iron in order that magnetic plaques 27 can be readily positioned and supported at will about the rim of the totalizer scale, each being marked with suitable information. As herein shown each plaque bears a different time as 9-o'clock, 10-o'clock, etc. The corner of the plaque closest to the scale indicates the portion of the total days work accomplished and whether the work load is running on, ahead, or behind schedule.

Referring now more particularly to FIGS. 2 and 3, the mechanism will be described for supporting and operating each of the numerous indicators positioned behind windows 22. As there shown, the indicators comprise endless flexible belts 24 each supported on rollers 28,28 mounted across the open end of U-shaped brackets 29,30 and secured to the opposite ends of main frame 31. Desirably, at least one bracket for each belt is adjustable by means, not shown, to adjust the belt tension. One end of the main frame 31 is equipped with a long driving roller 32 in close proximity but out of contact with belt rollers 28. This roller is driven by an electric motor 33 which preferably operates continuously.

The means providing a driving connection between roller 32 and any selected one of the display belts 24 utilizes a solenoid 35 located between the legs of each bracket 29. Its armature 36 is normally held retracted by a tension spring 37 acting on a pivoting bracket 38 mounted on pin 39 extending between the legs of bracket 29. Bracket 38 supports a resilient idler roller 40 for movement to a position engaging both the driven roller 32 and the adjacent surface of belt 24. As shown in FIG. 3, solenoid 35 is deenergized and spring 37 holds roller 40 pivoted counterclockwise out of engagement with belt 24. However, when solenoid 35 is energized its armature is extended to shift roller 40 into firm frictional driving engagement with both roller 32 and belt 24.

Each of belts 24 is provided with a low height projection or perforation 42 (FIG. 2) positioned to engage and pivot the operating lever 43 of a microswitch 44 rigidly supported in any suitable manner near the left hand end of each belt. This switch is arranged in a circuit for operating, in a manner to be described presently, to de-energize the associated solenoid 35 and abruptly discontinue driving that belt at the moment it reaches its starting position. Referring now to the right hand end of the belts 24 as shown in FIGS. 2 and 3, there will be described the switch means used to stop the advance movement of each belt at the end of any selected increment of advance. This means comprises a row of cutouts perforations or raised bosses provided at equal intervals along the length of each belt. These cutouts or raised bosses, whichever is selected for use, control the operation of a microswitch 47 fixed to the main frame at any convenient point and effective to de-energize the solenoid 35 associated with the particular belt and assures stoppage of the belt at a precise point.

THE CONTROL CIRCUIT

The portions of the control circuitry located in the respective control consoles 12,13 are shown within respective dotted line boxes in FIG. 4. The remaining components of the apparatus are conveniently located within the control board proper 11, the several sub-assemblies of the control circuitry in both the board and the consoles being interconnected by cabling 14 in the manner indicated in FIG. 1. The 24 volt d.c. power supply may be located in the control board or elsewhere and is used to power all components except motor 33 driving the indicators and totalizer motor 49 employed to drive totalizer indicator hand 26, the latter two motors being connected to any convenient power source, such as 115 volt alternating current supply.

The controls in each console are identical as is evident from a consideration of FIG. 4. Accordingly, only the components of console 12 need be described, it being understood that the operation of console 13 is identical with console 12, now to be described.

Console 12 includes a master relay K2 the five contacts of which are normally in the open position illustrated in FIG. 4. In the upper center portion of the control panel, is a selector switch 16 having a separate contact for each increment of the information indicator bar, belt or tape 24. It will be understood that the movable member of selector switch 16 comprises an arcuate metallic contactor having a notch 50 shaped to straddle a single switch contact. This switch may be equipped with a ball detent or the like to assure that the switch stops only in a position with notch 50 registered with a particular contact leaving all other contacts of the selector switch in contact with and shorted by the switch arm. The setting of selector 16 in any particular position conditions or arms stepping relay K7 for operation through a particular selected number of increments as will be explained presently.

Located below selector switch on console 12 are the two normally open push button switches PS1, PS2 located to either side of the red pilot light P3. Housed within the buttons of switches PS1 is the green pilot light P1, and within PS2 the amber pilot light P2. When that particular console is in use the green light P1 is energized, and red pilot light P3 is energized if the system is in use by another console to register a change in information; amber pilot light P2 is energized only when verifying that the totalizer drive motor has been disconnected as it should be if a change is being made on he display board not involving the registration of time or other indicator movement increment being summed by totalizer 25.

Another important control sub-assembly on each control console comprises the information channel selector 17 having two independently operable rotary control discs 18,19. These control discs are connected to rotors each displaying digits 0 through 9 identifying a particular information channel 24 on the display board. They are also used to position switches 18,19 supplying power to solenoids 35, (FIGS. 2 and 3) controlling the clutching and declutching of the power drive to the selected channel indicator belt 24 (FIGS. 1 and 2). As shown in FIG. 1 switch dials 18,19 are rotated to the proper position to select channel number 03 for an updating operation. If channel 13 should be the one desired for updating, then the operator would rotate the "units" control switch 18 until digit 3 is properly centered in the viewing window and then proceeds to operate the "tens" switch 19 until digit 1 is similarly centered.

It should also be pointed out that the control circuit in the exemplary embodiment illustrated includes a number of relays having the following principal functions. Thus relay K1 serves as an antirepeat relay and safeguards against unintended and spurious operating signals which otherwise might occur. Relay K2 is a console control relay, it being noted that one is located in each of consoles 12 and 13. Relay K3 is the totalizer control relay governing operation of totalizer drive motor 49. Relays K4 and K5 serve in clearing the system and in restoring the components to their original or starting positions. Relay K6 is the totalizer disabling relay and relay K7 is a stepping relay controlling the operation of the various information indicators 24 to precise increments of any selected number as determined by the setting of selector switch 16.

Numerous diodes are also employed throughout the control circuit and function in well known manner to prevent current flow except in a desired direction.

OPERATION TO RECORD INFORMATION ON DISPLAY BOARD

As shown in FIG. 1, display board 11 is set up for use in monitoring a utility service operation having available eight repair specialists for each of whom there is a separate information indicator 24 occupying spaces numbered 2 through 9 at the left hand end of the respective indicators. The particular legends opposite these respective numbers may be placed on magnetic plaques in order that these plaques can be changed readily and at will. Specialists 2 through 6 are available to receive service orders and specialist number 7 is designated for repair work. However, this is the off-day for specialist 8 and accordingly his space is appropriately marked "O-day". Specialist 9 is on vacation and his space is appropriately marked to so indicate.

Indicators 10 through 13 have been designated for use for special purposes. Thus indicators 10 and 12 are marked as available for service orders received but for which no servicemen are available at that facility on that particular day. The operator may be able to borrow servicemen from a nearby branch of the same utility to handle these jobs. Indicators 11 and 13 are marked to indicate service orders for which this particular facility has extra servicemen available for loan to other nearby branches.

It will of course be understood that the foregoing selection of uses for the various information indicators is merely one of innumerable use assignments which might be handled and monitored by the invention display apparatus.

Let it be assumed that the supervisor in charge of the display board has set up the plaques opposite the left hand end of the indicators in the order shown in FIG. 1. Let it further be assumed that he has six men available for full-time 8-hour duty during that day. He then knows that his six men performing eight hours of work provide him with a total of 48 hours of manpower. This time divided by six men tells him that by 9-o'clock one sixth of the days work should be completed. Accordingly he places the lower left corner of the 9-o'clock plaque 27 opposite the sixth hour mark on the scale of totalizer 25. In like manner the corresponding corner of the 10-o'clock plaque is placed opposite the twelfth hour scale mark. Indicator hand 26 of the totalizer includes a slip clutch enabling this hand to be manually reset clockwise to the zero position.

The next operation is to reset all of the indicators belts 24 to their zero position. This is done by closing reset button PS3 located on the display board and connected across contacts 11 and 14 of the reset relay K5. Momentary closing of this switch energizes the coil of relay K5 causing its contacts to close downwardly whereupon the normally closed contacts of relay K4 provide a holding circuit to maintain K5 energized for the duration of the reset operation. This holding circuit remains energized so long as any one of the indicator belts 24 is out of its zero starting position. This is because if any belt is not in zero position the boss 42 on that belt will be displaced from the contactor of the associated switch 44 and that switch will be closed downwardly. Accordingly and as will be apparent from FIG. 4, all belts regardless of the number thereof, are restored to starting position in sequence starting with the belt operatively associated with the upper one of switches 24 and proceeding in sequence until the last one of these switches is closed upwardly. When the last belt is in starting position, the lower contact of the last one of switches 24 opens thereby energizing relay K4 to interrupt the holding circuit for relay K5. As the latter relay moves to open position, its contacts 8,9 open to de-energize relay K4.

The apparatus is now conditioned for use and the operator may use either console to introduce information from the field or from any source on display board 10. Let it be assumed that serviceman 3 reports from the field that he has completed his first job assignment on schedule and that it took him one hour to complete the job. This one hour period represents four increments of time or the distance spanned by four of the perforations 45 in belts 24. Accordingly, the operator moves selector switch 16 four notches from its zero position so that notch 50 of its metallic switch arm overlies and is out of contact with the fifth contact of that switch. All other contactors of that switch will then be short circuited by the contact arm, and the driving circuit, including the associated one of solenoids 35 for that belt, will then be armed or conditioned for current flow during four stepping pulses applied to stepping relay K7. In other words solenoid 35 will be conditioned to maintain the clutch for that solenoid engaged with the belt for serviceman 3 until the fourth perforation 45 (FIG. 2) underlies the tip of the contact for sensing switch 47 (FIGS. 2 and 4), all as will appear more clearly presently. The next step is to rotate console knob 18 until the numeral 3 appears in window 17. This operation also moves the arm of "units" switch 18 to contact number 3 of that switch thereby selecting the proper one of solenoids 35 for energization to drive the belt for serviceman 3.

This operation having been completed, the supervisor or operator momentarily depresses data input switch PS1. The momentary closing of this switch supplies power from the positive side of the power supply, through PS1, past the two diodes immediately adjacent the output side of this switch, and thence to the coil of relay K1, as well as past the closed contacts 4 and 5 of that relay to the release solenoid for pawl 52 of stepping relay K7. It will be understood that a torsion spring associated with the rotor of this relay is now free to return the stepping relay to its zero position. The contacts of the K1 relay do not close for a short interval due to the time delay circuit associated with the coil of this relay thereby assuring that relay K2 will close prior to K1.

It will be apparent from FIG. 4 that the closing of data input switch PS1 permits power to flow from the output side of that switch through contacts 7,8 of K1, and thence through the K2 coil. Relay K2 is maintained energized through a holding circuit provided by its contacts 14,15 and is broken only when this latter circuit is interrupted.

Solenoid 35 for serviceman 3 is now energized from the power supply via contacts 5,6 of K2 and switch 18. The continuously operating motor 33 driving roller 32 for all of the belts is now effective to drive a belt for serviceman 3 because its drive clutch controlled by solenoid 35 is closed.

The advance of this belt to the right, as viewed in FIG. 1 is then effective to open and reclose the associated belt movement sensing switch 47 each time its operating lever passes one of the perforations 45 in the belt (FIG. 2. In this connection it will be remembered that when the belt is in any stopped position, as its zero position, the contactor of switch 47 will be positioned in one of the belt perforations 45 with the result that switch 47 is closed. However, immediately that the belt begins to move, the contactor will ride out of the perforation, opening the switch and conditioning the switch to send an energizing pulse to stepping relay K7 the moment the switch contactor enters the next perforation of belt 24. Since switch 16 has been set for one hour, or four increments of advance, four perforations of the tape will underride the contactor of switch 47 thereby pulsing relay K7 four times, advancing it switch blade to its fourth contact. As soon as the relay switch blade reaches the fifth contact it will find that contact is not in circuit with the contact registered with notch 50 of selector switch 16, so that the holding circuit to the coil of relay K2 is now open and de-energized thereby disconnecting the power supply to K1.

During the pulsing of stepping relay K7 it will also be apparent from FIG. 4 that power is supplied to totalizer relay K3 via the contacts 4,5 of its holding relay K6. As soon as K3 is energized its contacts supply 115 volt power via its contacts 2,3 to totalizer motor 49. The instant the totalizer motor starts, it closes switch 53 to supply holding power to relay K3 via its now closed contacts 5,6. Accordingly, a single pulse to the actuating relay K3 is adequate to complete a holding circuit to this relay which remains energized only for the smallest increment of advance of indicator belt 24. This is because switch 53 opens automatically as the totalizer motor moves through this single increment. However, the next energizing pulse received by stepping relay K7 is also routed to the totalizer relays K3 to repeat the cycle just described with the result that the latter registers one hour advance of totalizer pointer 26.

From the foregoing it will be recognized that any one of belts 24 can be advanced either a single or any selected number of increments as totalizer 25 advances in synchronization with the belts through the same range of movements each time selector switch 16 is set in a particular position and the data input switch PS1 is closed. It will likewise be recognized from the schematic that green pilot light P1 connected across the coil of K2 is energized thereby indicating to the operator that console 12 is in use. Likewise red pilot light P3 of console 13 is energized warning the operator at that console that the system is in use and that console 13 cannot be used so long as light P3 remains energized.

The system is now ready for the next entry of information on any one of the indicators and from any console.

Operation of the totalizer can be deactivated at any time although this is undesirable so long as entries are being made on any indicator the increments of which are to be summed by the totalizer. In certain instances, such entries are undesirable and inappropriate. In this event the totalizer is readily deactivated by first closing the clock disconnect switch PS2 and holding it closed while closing data input switch PS1. Momentary closing of the switches in this manner assures a supply of power through the two switches just mentioned, contacts 10,11 of K2, thereby energizing relay K6 and interrupting the power supply to totalizer relay K3 and its motor 49.

While the particular manually controlled automatic information display device herein shown and disclosed in detail is fully capable of attaining the objects and providing the advantages hereinbefore stated, it is to be understood that it is merely illustrative of the presently preferred embodiment of the invention, and that no limitations are intended to the details of construction or design herein shown other than as defined in the appended claims.

I claim:

1. An automated graphical display device viewable from a distance and useful in displaying multiple channels of changeable information, said device comprising a plurality of independently controllable bodily movable strip means linearly positionable independently of one another to display separate channels of information of selected length relative to a datum reference position and which information is meaningful independently of the presence or absence of information on any other one of said channels, a control station remote from but operatively connected to said independently controllable means equipped with information control selecting means including means for controlling a change in the linear position of the information displayed in any selected one of said separate channels independently of all other ones of said channels.

2. A display device as defined in claim 1 characterized in the provision of common driving means for all of said information display channels including separate drive means operable when activated by said control means to operate the associated one of said display channels to a new position.

3. A display device as defined in claim 2 characterized in that said common driving means includes means for restoring any of said display channels to a predetermined starting position after a period of use.

4. A display device as defined in claim 3 characterized in that said means for restoring said display channels to their respective starting positions initiates the restoration of said display channels to their respective starting positions in sequence.

5. A display device as defined in claim 1 characterized in that said plurality of independent display channels are arranged in side by side relation for convenience in making direct comparisons of information on different ones of said channels.

6. A display device as defined in claim 5 characterized in that said display channels include a plurality of elongated stationary windows each registered with a respective one of said independently controllable means.

7. A display device as defined in claim 6 characterized in that each of said independently controllable means includes a movable display unit having portions thereof distinctively marked for contrast with other adjacent surfaces and ease of comparison of the relative positions of the different ones of said display units.

8. A display device as defined in claim 6 characterized in that said display units comprise strips of flexible material movable lengthwise of the associated window and having each end portions contrastingly marked.

9. A display device as defined in claim 7 characterized in the provision of totalizer means operatively associated with each of said display units and operable to add each new movement of any unit to the sum total of all previous display unit movements.

10. A display device as defined in claim 1 characterized in that said separate channels of information are normally deactivated and remain in their respective selected display positions until deliberately moved to a new position by operation of said information control selecting means.

11. A display device as defined in claim 1 characterized in that the same includes electrically energized means for shifting said information display channels to any selected linear position on said display device, and said information display channels each being arranged to remain in any selected position until and unless deliberately moved to a new position by activation of said electrically energized means whereby a power failure does not result in loss of the displayed information.

12. System control apparatus for recording and displaying a series of inter-related types of information for use in coordinating and supervising related activities, said apparatus comprising in combination, a large area display board having a plurality of elongated strip information indicators movably supported thereon for independent linear indexing movement lengthwise of said strip and each effective to display intelligence which is complete and independent of that displayed on any other one of said indicators, means for linearly indexing any selected indicator strip to a new position along the front face of said display board independently of other of said indicators, and control means manipulatable by an operator at a control station for operating any selected one of said indicators in random order to a different selected position to display intelligence which is completely independent of that on any other one of said indicators.

13. System control apparatus as defined in claim 12 characterized in that said control station is located remotely from said display board but operatively connected with the respective indicators thereof.

14. System control apparatus as defined in claim 13 characterized in the provision of separate control stations each adapted to be manned by a separate operator and each operatively connected with each of said information indicators for use in updating the positions thereof.

15. System control apparatus as defined in claim 14 characterized in the provision of means at each of said control stations operable to render all other control stations inoperable to update the positions of said information indicators while a particular control station is in use.

16. System control apparatus as defined in claim 12 characterized in that said information indicators utilize a common motor for driving said indicators, and means for coupling said common motor to a selected indicator while moving the same to a new position thereof.

17. System control apparatus as defined in claim 16 characterized in the provision of means for deactivating the driving connection of said common motor from a selected one of said indicators automatically when a selected indicator reaches the desired new position thereof.

18. System control apparatus as defined in claim 12 characterized in the provision of means for sensing the arrival of an indicator at the selected new position thereof and for thereupon deactivating the movement of said indicator.

19. System control apparatus as defined in claim 12 characterized in that said indicators comprise separate tape means supported in taut condition between separate rollers.

20. System control apparatus as defined in claim 19 characterized in that said taut tapes have the opposite end portions thereof distinctively and contrastingly marked.

21. System control apparatus as defined in claim 19 characterized in that the separate rollers supporting one end of said indicator tapes are mounted independently of one another adjacent roller means coupled to a single driving motor, and means for briefly coupling a selected one of said separate rollers to said motor driven roller means until the associated indicator tape reaches a selected new position thereof.

22. System control apparatus as defined in claim 21 characterized in the provision of means for maintaining a selected indicator tape in movement by said driving motor until said tape has reached a selected new position thereof despite the length of the new movement in comparison with the length of any preceding movement of said tape.

23. System control apparatus as defined in claim 12 characterized in the provision of totalizer means on said display board readable from said control station and operable to sum the movement of all of said indicators in turn.

24. System control apparatus as defined in claim 12 characterized in the provision of manually operable means at said control station to select a particular indicator for advancement to its next updated position, and means coupled to said manually operable means for indicating which one of said indicators is then in position for updating.

25. System control apparatus as defined in claim 24 characterized in that said control station includes means responsive to the closing of electric switch means to initiate an automatic updating cycle for a particular indicator after that indicator has been readied for updating and including signal means which is activated at the end of the updating cycle to show the cycle has been completed.

26. System control apparatus as defined in claim 12 comprising means operable in response to an actuating impulse manually initiated to restore each of said information indicators to a predetermined starting position and to terminate the restoration cycle automatically as each information indicator reaches its starting position.

27. System control apparatus as defined in claim 26 characterized in the provision of indicator means operable to indicate when the apparatus is in condition to begin an updating cycle of operation.

28. An operating cycle control mechanism for a graphical display apparatus comprising means for advancing an information display tape past a sensing station, said tape having a series of cutouts distributed in equally spaced apart relation lengthwise of said tape in the path of travel past said sending station, switch means at said sensing station having operating means positioned in the path of each of said cutouts and adapted to operate said switch means between the open and closed positions thereof as each of said cutouts reaches and/or leaves said sensing station, drive control means for said tape operatively connected in circuit with said switch and responsive to the opening and closing thereof to deactivate said tape advancing means as the last one of any preselected sequential number of said perforations reaches said sensing station and operates said switch means.

29. Control mechanism as defined in claim 28 characterized in that said tape drive control means operatively connected to said switch includes means for counting the separate sequential pulses generated each time a tape cutout passes said sensing station.

30. Control mechanism as defined in claim 29 characterized in the provision of means adjustable to operate an electric control circuit in response to the generation of any preselected number of sequential pulses by said tape and said switch means.

31. In an automated graphical display device having means for displaying changeable information under remote control, control means for controlling said changeable display means comprising a length of tape and power means for advancing the tape past a sensing station, said tape having a series of equally spaced cutouts distributed therealong and positioned for advancement past said sensing station, sensing means at said sensing station responsive to movement of each of said series of cutouts therepast to transmit a control signal to said power means to advance the tape lengthwise thereof by the distance between said cutouts for each transmitted one of said control signals, and selector means for preselecting any desired number of consecutive increments of advance of said tape to be carried out automatically.

32. A graphical display device as defined in claim 31 characterized in that said power means for advancing said tape is operable to hold said tape stationary between actuating signals received from said cutout sensing means.

33. A graphical display device as defined in claim 32 characterized in the provision of a plurality of said power advanced tapes each controlled by an associated one of said control means and an associated sensing means.

34. A graphical display device as defined in claim 33 characterized in that each of said power advanced tapes and the associated control means therefor are operable independently of each of the other ones of said tapes.

35. A graphical display device as defined in claim 34 characterized in that each of said power advanced tapes includes means for displaying information which is separate, complete and independent of the information displayed on other ones of said tapes.

36. A graphical display device as defined in claim 33 characterized in the provision of means for restoring each of said power advanced tapes to their respective initial positions.

37. A graphical display device as defined in claim 33 characterized in the provision of a control station for said plurality of power advanced tapes including means for visually indicating to an operator the change being selected for a chosen one thereof and including release control means for initiating an appropriate change control signal to effect that change in the chosen one thereof.

38. A display device as defined in claim 1 characterized in that said control means for said multiple channels includes manually manipulatable means for selecting a particular one of said channels to be updated and including means for making any one of a plurality of changes therein in a single updating cycle of operation.

39. A display device as defined in claim 1 characterized in that said multiple channels comprise separate and independent continuous strips conveying distinctive markings and shiftable bodily to different positions along the face of said display device.

40. A display device as defined in claim 1 characterized in the provision of rotary drive common for all of said continuous strips and including means selectively operable by said rotary drive means to advance any selected one only of said strips by a desired distance lengthwise of itself along the face of said display device.

* * * * *